United States Patent [19]
Griffin et al.

[11] Patent Number: 5,958,050
[45] Date of Patent: Sep. 28, 1999

[54] TRUSTED DELEGATION SYSTEM

[75] Inventors: Claire Griffin, San Francisco; Douglas Barnes, Oakland, both of Calif.

[73] Assignee: Electric Communities, Cupertino, Calif.

[21] Appl. No.: 08/777,328

[22] Filed: Dec. 26, 1996

Related U.S. Application Data

[60] Provisional application No. 60/026,645, Sep. 24, 1996.

[51] Int. Cl.[6] .............................. G06F 12/14; G06F 13/00
[52] U.S. Cl. .............................. 713/200; 713/201; 706/47
[58] Field of Search ........................ 706/47; 395/187.01, 395/186; 713/201, 200

[56] References Cited

U.S. PATENT DOCUMENTS

| | | | |
|---|---|---|---|
| 4,584,639 | 4/1986 | Hardy . | |
| 4,809,219 | 2/1989 | Ashford et al. | 364/900 |
| 5,692,047 | 11/1997 | McManis | 380/4 |
| 5,720,033 | 2/1998 | Deo | 395/186 |
| 5,748,964 | 5/1998 | Gosling | 395/705 |
| 5,751,595 | 5/1998 | Beatty, III et al. | 364/490 |
| 5,774,552 | 6/1998 | Grimmer | 380/25 |

OTHER PUBLICATIONS

Shoffner et al., "Java and Web–Executable Object Security," *Dr. Dobb's Journal*, 1996;38–49.

*Primary Examiner*—Robert W. Beausoliel, Jr.
*Assistant Examiner*—Brian H. Shaw
*Attorney, Agent, or Firm*—Philip H. Albert; Townsend and Townsend and Crew

[57] ABSTRACT

A trust manager examines each new class before it is allowed to execute by examining a policy file which includes data structures defining security policies of the user system, a certificate repository for storing a plurality of certificates, a certificate being a data record which is digitally signed and which certifies claims relevant to a security evaluation, a code examiner adapted to analyze the portion of code to determine potential resource use of the portion of code and a trust evaluator adapted to evaluate certificate requirements of the portion of code based on policy rules extracted from the policy file and the potential resource use specified by the code examiner. The trust evaluator also determines, from certificates from the certificate repository and a code identifier identifying the portion of code, whether execution of the portion of code is allowed by the policy rules given the potential resource use, the code supplier and applicable certificates. Certificates and policies can be specified in hierarchical form, so that some levels of security can be delegated to trusted entities.

17 Claims, 7 Drawing Sheets

```
---Certificate Start---
FudcoKey  = KeyFP(ECR,"AAACAAAAAEDMGRQy4svezmyBOzQEwpjhuYXR
                      KCOpDA4ha89oyuBqLIlghcCowwlvdj/krFq97HvSOFMtf9/8b
                      B8uSdqMZE1AAAAAwEAAaA4");

FudcoDevelop = KeyFP(ECR, "FAAFAAFAA");

POLICY states {
    FudcoKey CanMakeClaim where (
        delegate == "true" and claim == "PkgBelongCert where
                                         (pkg == \"*\")"
    );
    FudcoDevelop CanMakeClaim where (
        delegate == "yes" and claim == "PkgBelongCert where
                                        (pkg == \"fudco.*\")"
    );
}

Forward: "http://fudco.com/keys/mis-boot-keys"
Resolve: "http://keys1.fudco.com/keys/keyserve/"
Resolve: "http://keys2.fudco.com/keys/keyserve/"
Certificate Signature = "AAABBCCDFE1232435"
---Certificate End---
```

TRUSTED DELEGATION SYSTEM

CROSS REFERENCE TO RELATED APPLICATIONS

This application claims priority from a provisional application Ser. No. 60/026,645 filed Sep. 24, 1996. That provisional application is incorporated herein by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of trust management in a distributed control environment. More specifically, one embodiment of the invention provides for management of trust relationships among code segments to be executed inside a trust boundary.

No practical computer can be completely secure. If a computer system operator were to distrust all software not personally written, the operator could erase all the software on a computer system running in a room with one door secured with an around-the-clock guard and no eternal connections to the machine and then write secure code from scratch. The system is still not completely secure, since the computer system might have been manufactured with an interface to an implanted radio transceiver, thus leaving the computer system vulnerable. If a security mechanism is to be workable, the designer of the security mechanism must assume a base level of trust of some aspect of the computer system.

This base level of trust can vary depending on the use of the computer system and could range from complete trust of everything, to trust of only the equipment and data found in a locked building and purchased from a reputable source, or trust of only a known good microprocessor. Wherever this base level of trust is set, it defines a "trust boundary" separating that which is trusted and that which is not trusted. A trust boundary envelops computer resources, data and people so that unauthorized and untrusted users, programs and data processing systems are prevented from accessing resources of a computer system or reading or modifying the data stored by that computer system.

It is important to note that, when it comes to complex computer systems, trust is not just a matter of one's good faith or intentions. An otherwise trustworthy person may cause great damage to a computer system by making a mistake or running a program with bugs, viruses or Trojan horses. For this reason, robust computer systems are designed with the "principle of least authority" in mind. That principle dictates that a user or program should be granted only the authority needed to perform the task at hand and no more, to prevent intended and unintended ill effects.

With early mainframe computers, security was simple. The trust boundary was the building housing the computer, no communications lines ran outside the building and only trusted personnel were granted physical access. Personnel not intimately involved in the data processing operations where considered untrusted users and thus outside the trust boundary. An untrusted user having legitimate business with the mainframe had to go through a technician who handled tasks for the user.

With timesharing machines, users had access to the computer system directly via terminals, but access was controlled by passwords to inhibit unauthorized access and the operating system of the computer system included software protection to prevent unintentionally destructive actions by the users. For example, even an authorized user running a misbehaving program could not destroy the data files of another user or crash the computer system. (At least that was the ideal goal of timesharing machine designers.)

Today, desktop computers are proliferating and also require security. The typical method of securing a desktop computer from unauthorized use is to physically secure it in a room or office building. Even if the computer has connections to an external network, the computer is secured by the fact that the operating system of the desktop computer does not have any code which is controllable by an outside person or machine. The assumption that the operating system does not have a portal accessible from the outside is invalid when an authorized person runs a program knowingly or unknowingly which executes code which allows such access.

Misbehaving programs are likely to become more commonplace as more people use computers who do not understand how computers work, since today's user interfaces encourage programs to be run transparently and without specific user initiation or supervision. Furthermore, as more people connect to open networks such as the Internet, more programs of unknown origin find their way onto their machines and are executed with ill effects.

One way to prevent misbehaving programs is to disallow the use of external programs altogether. If a computer is built without any mechanism for loading a program from an external source and then executing that program, then no misbehaving programs will affect its operations (except for misbehaving programs which have been within the computers trust boundary all along). However, this limits the usefulness of the computer and the benefits of improved technology, ease-of-use transparency and other advantages of personal computers.

Such a computer could not even fully browse today's World Wide Web (the global web of hyperlinked documents and servers operating over the Internet; hereinafter "the Web"). Many Web sites have pages which require Web applet execution for proper viewing. A Web applet is provided by the server of the page being viewed and is a code snippet which is executed by the browser user's computer at the request of the browser. The fact that the applet is executing is often totally unknown to the user, until an improper or malicious applet causes the computer to start acting erratically, the applet transmits the user's private data to the outside world, deletes the user's data, or uses up excessive computing resources.

To prevent the harm causable by misbehaving programs, the computer system must have a security mechanism. One such security mechanism for applet execution is the security provided by the Java™ runtime system developed by Sun Microsystems of Mountain View, Calif. and licensed to many software developers. The Java™ runtime system is used in connection with a computer connected to the Internet. For example, where a Java™-compatible Web browser encounters a Web page containing a Java™ applet, the browser might download and execute the applet without asking the user. The Internet should be outside the user's trust boundary, since the user does not control and cannot trust every program on the Internet. Therefore, there is a risk that the user will encounter an applet whose goal or unintended effect is to harm the user's system. To prevent this harm, the browser is programmed to ignore Java™ language statements which may be used for unauthorized access. For example, the browser might be set so that no applet is able to read preexisting files on the user's system and is only able to modify files which are created by the applet itself. If an applet is obtained by the user from a reliable source, these restrictions may be unduly limiting.

Even if an applet system were devised where dangerous programs could be executed if a user is willing to accept the increased risk in exchange for increased functionality, a software provider will often apply the most stringent limits on their software to avoid problems with the most risk adverse customers. Thus, if the constraints are set in advance by the application, the applets will be unduly limited to the lowest level of functionality and if the constraints are set by the software provider, the applets will be unduly limited to functionality constraints of the provider's strictest customer. As a corollary to the Principle of Least Authority, in order for a program to be useful, it cannot be constrained to the point where it is not given the authority to perform its assigned tasks.

From the above it is seen that an improved trust management system is needed where trust in program code can be varied for a user given the user's particular circumstances and the source of the program code.

SUMMARY OF THE INVENTION

An improved trust management is provided by virtue of the present invention. In one embodiment of a trust manager according to the present invention, the trust manager examines each new class before it is allowed to load, execute or otherwise gain control of resources by examining a set of claims in a policy file and a certificate repository. The trust manager proves a claim before allowing a class to be loaded if a policy statement requires proof. Proving is done by finding a chain of claims from a claim about the class being loaded to a claim setting out a policy statement. A certificate contains one or more claims, where a claim is a data structure defining a security policy of assertion about a class, package of classes, or an entity to be trusted or not trusted. Certificates are signed so that they are difficult to falsify. The trust manager system also includes a code examiner adapted to analyze a portion of code to determine potential resource use of the portion of code and a trust evaluator adapted to evaluate certificate requirements of the portion of code based on policy rules extracted from the policy file and the potential resource use specified by the code examiner. The trust evaluator also determines, from certificates from the certificate repository and a code identifier identifying the portion of code, whether execution of the portion of code is allowed by the policy rules given the potential resource use, the code supplier and applicable certificates.

In some embodiments, the certificates are included with the code, while in others references to a central certificate repository are included. Certificates and policies can be specified in hierarchical form, so that some levels of security can be delegated to trusted entities.

A further understanding of the nature and advantages of the inventions herein may be realized by reference to the remaining portions of the specification and the attached drawings.

BRIEF DESCRIPTION OF THE DRAWINGS

Appendix A is a listing showing further examples of claims in certificates in a certificate repository.

DESCRIPTION OF THE PREFERRED EMBODIMENTS

As described below, one use of the present invention is to limit the execution of code within a trust boundary to control access to computer resources within the trust boundary. In order to put forth a concrete example, the portions of code being examined and executed are classes defined in an object-oriented programming environment. It should be understood that the present invention applies as well to other programming models, such as where portions of code are organized into subroutines, functions or code snippets. Therefore, the present invention is not limited to object-oriented programs. Furthermore, the portions of code loaded need not necessarily be divided at class boundaries, but doing so greatly simplifies the operation and explanation of the system.

In the embodiment described, claims and certificates are used in the process of determining whether trust is warranted. Claims are statements made by a claimant. If the claimant can be trusted and the claimant is authorized to make a claim, then the claim will be assumed to be true. Typically, the trustworthiness of a particular claimant and the claimant's authorization to make a particular claim are established by other claims which cannot always be assumed to be true. The process of "proving" a claim is one of verifying the claimant, a level of trust in the claimant and the authorization of that claimant, typically using other claims. This leads to a chain of claims ending with a known trusted claim or claimant.

A claim makes an assertion. An assertion could be that a particular claimant can be trusted, that a particular class should not be trusted, that a particular class can be trusted, etc.

A certificate is a set of one or more claims within a signed enclosure. An exception to this is a policy certificate, which proves its veracity not from a signature on the certificate, but by it being found within the trust boundary. Policy certificates form the axioms of a trust structure, i.e., they are taken as being true without having to be proven. Typically, policy certificates make claims about which classes and practices are acceptable and which aren't. In this way, the policy certificates define a trust policy for the computer system being protected.

In the default system, nothing will be checked unless a policy certificate claims that some classes must be checked. If a class must be checked, then the available certificates are examined for a claim that says that the class is OK to load (or whatever the class is being checked for). Of course, unless that claim is a policy claim, its claimant and the claimant's authority to make the claim must be verified. This checking process follows a chain of claims until either no more claims can be found or the claim is proved, as described above. Claims are found in certificates in the possession of the computer system being protected. If additional claims are needed, some certificates might include hints pointing to where other claims can be found. If no more claims can be found to complete a chain of trusted claims, all or part of the current chain is abandoned in favor of another chain in the web of trust formed by all the claims found, until no path from the claim to be proved and a trusted claim (e.g., a policy claim) can be found. This system of certificates and claims will now be described with reference to the figures.

Figure 1:
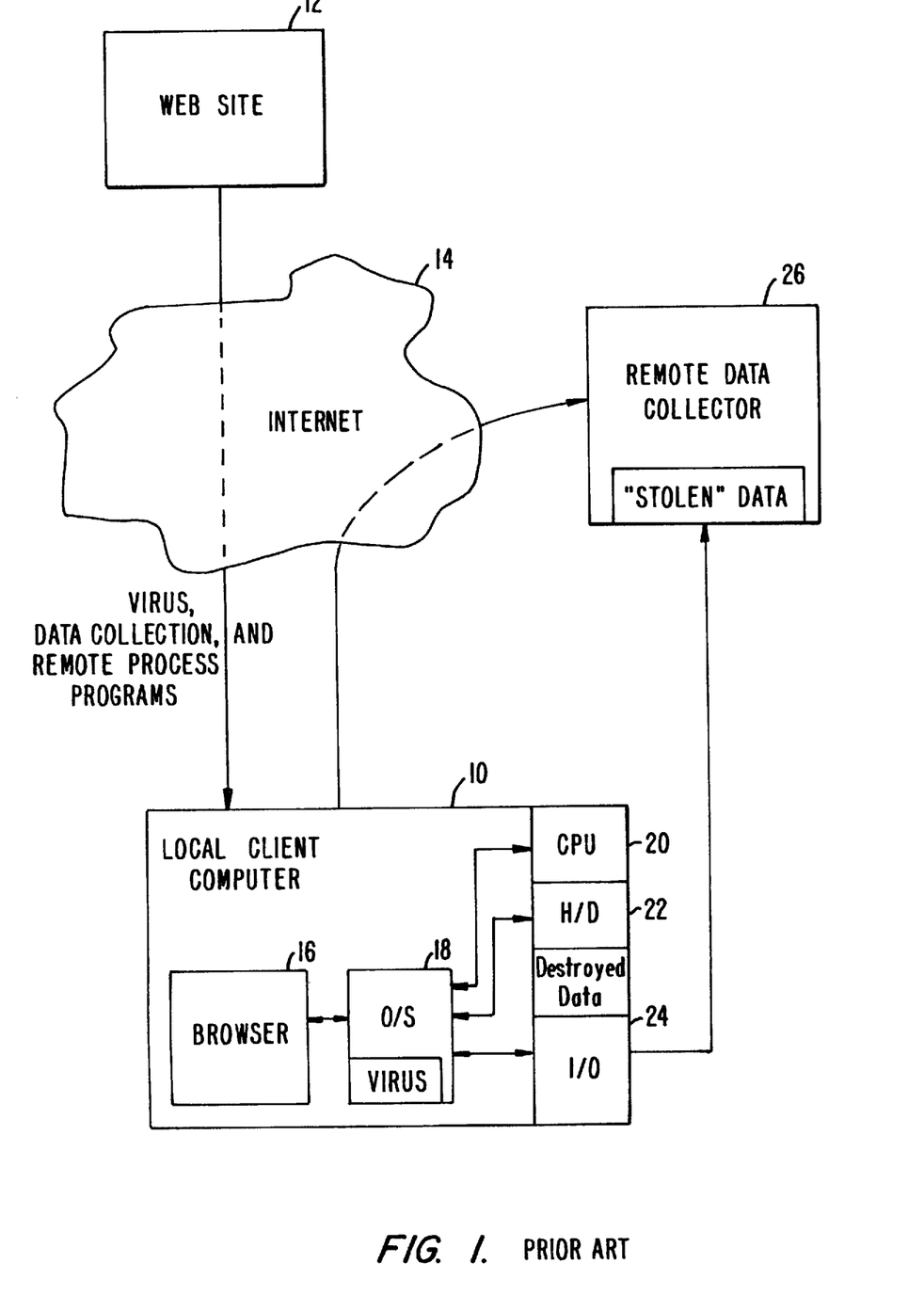
FIG. 1 is a block diagram of a distributed environment where local computers are subject to being controlled by programs loaded from external sources.

FIG. 1 shows how an unprotected client computer 10 might come under attack. Client computer 10, either under the direction of its user or a program it is executing, retrieves data from a Web site 12 via the Internet 14. Web site 12 is a site on the World Wide Web, which began as a globally interlinked document with the hypertext links from document page to document page evoking an image of a spider web. As the Web has evolved, it has become as much a structure for delivering data and programs in the form of applets as a structure for delivering views of documents. Because of the open, decentralized and organic nature of the Internet and the Web, the owner of client computer 10 cannot always be assured that the operator of Web site 12 will not try an attack on client computer 10. This is true even if the owner of Web site 12 is known to the user as being a reliable party, since it is possible to intercept and substitute packets as they pass from Web site 12 to client computer 10.

If an attacker is able to trick client computer 10 into accepting an attack program and client computer 10 executes the program, the client computer 10 is open to whatever attack mechanism was included in the attack program. One way this is done is to entice the user to download and execute an applet (a code segment which is executed by the user's Web browser 16), usually under the pretense of the applet performing a function desired by the user. If the attack program included a virus or other self-replicating code module, the attack program might modify the operation of client computer 10 to make it continuously vulnerable to the actions of the virus and make client computer 10 an unwitting partner in retransmitting the virus to infect other computers, in addition to delivering its "payload" of a message or destruction of user files.

The attacker might also send an applet which contains a hidden function for performing tasks on behalf of the attacker when the client computer is not being used. For example, a code breaker needing large amounts of parallel computing power might break up a large problem into many small pieces and send a small piece to each of many client computers, in effect to "steal" computing time from the client computers.

If the client computer contains sensitive private data, the applet might be programmed to take over the client computer's operating system (O/S) 18 and thus control the client computer's central processing unit (CPU) 20, hard drive 22 or input/output (I/O) devices 24. If an attacker can get browser 16 to execute such a program, that program might then be able to gather the user's private data and export it through the client computer's I/O devices or Internet connection to a remote data collector 26.

Another problem to look out for is where the user attempts to execute an applet which is not malicious, but just poorly written. These applets might be more of a problem than malicious applets, since malicious applets tend to spread themselves farther and garner more publicity, to the point where someone will find it worthwhile to create the equivalent of a virus checker which can identify the malicious applet. By contrast, the number of different poorly written programs would likely be greater, since they are easier to write and their ill effects might be too subtle to fuel any eradication efforts.

Figure 2:
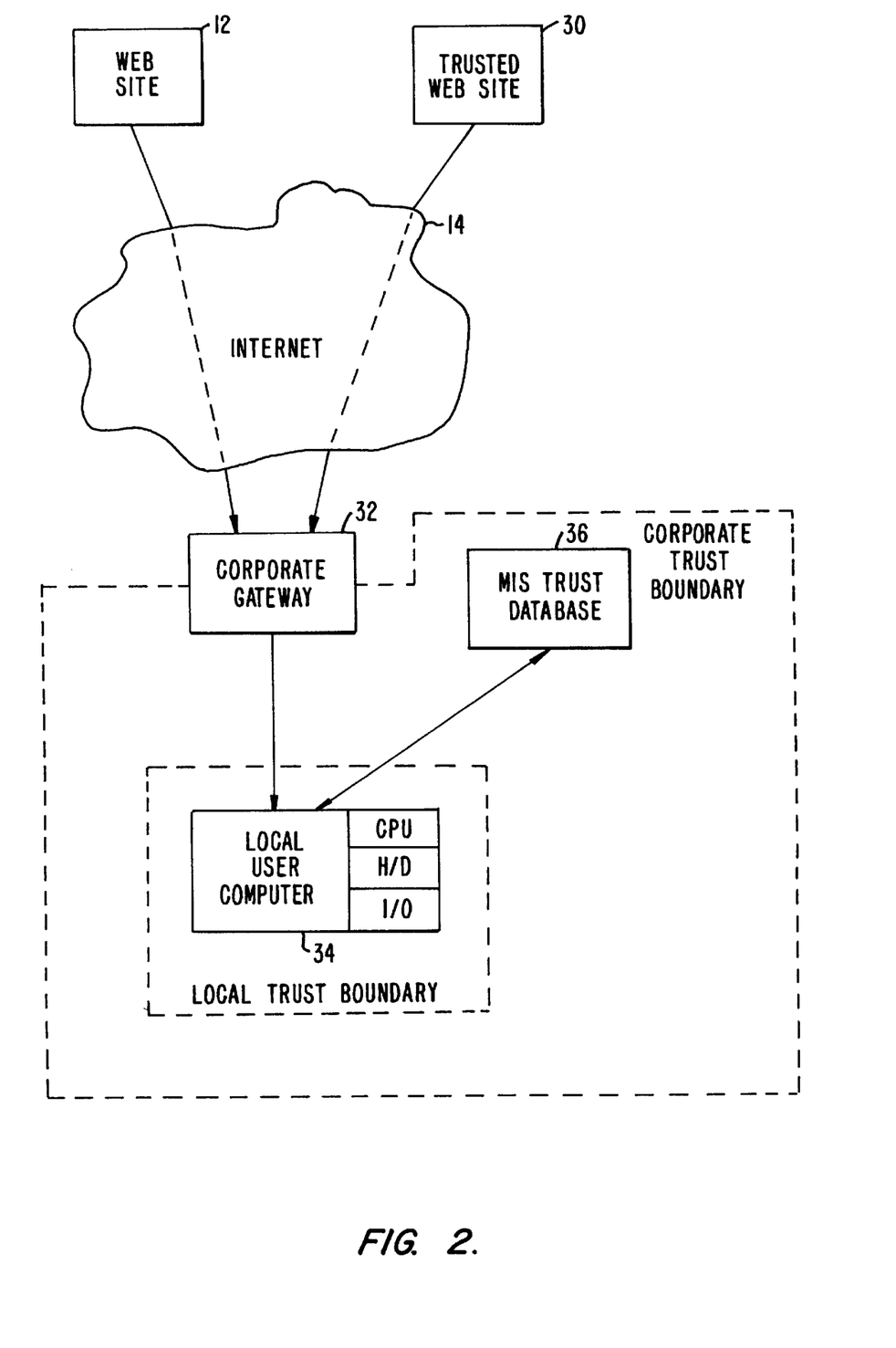
FIG. 2 is a block diagram of a distributed environment where a trust manager according to the present invention might be used to protect a client computer from unauthorized access or control.

FIG. 2 illustrates a trust boundary and how it is used to protect against the misbehaving programs just described. In FIG. 2, a local computer 34 is protected behind a local trust boundary secured by a trust management system according to the present invention. Where local computer 34 is a desktop computer, the security can be bypassed by gaining physical access to the computer, however we make an assumption here that this does not occur and other security mechanisms are in place to prevent this.

Local computer 34 is further secured inside a corporate trust boundary protecting all of the systems of the company for whom the user of local computer 34 works. Access outside the corporate boundary is controlled by a corporate gateway 32 and limits might be set by an MIS trust database 36. With protection in place, local computer 34 can access applets from an untrusted Web site 12 or a trusted Web site 30 and still have the elements within the local trust boundary protected.

Figure 3:
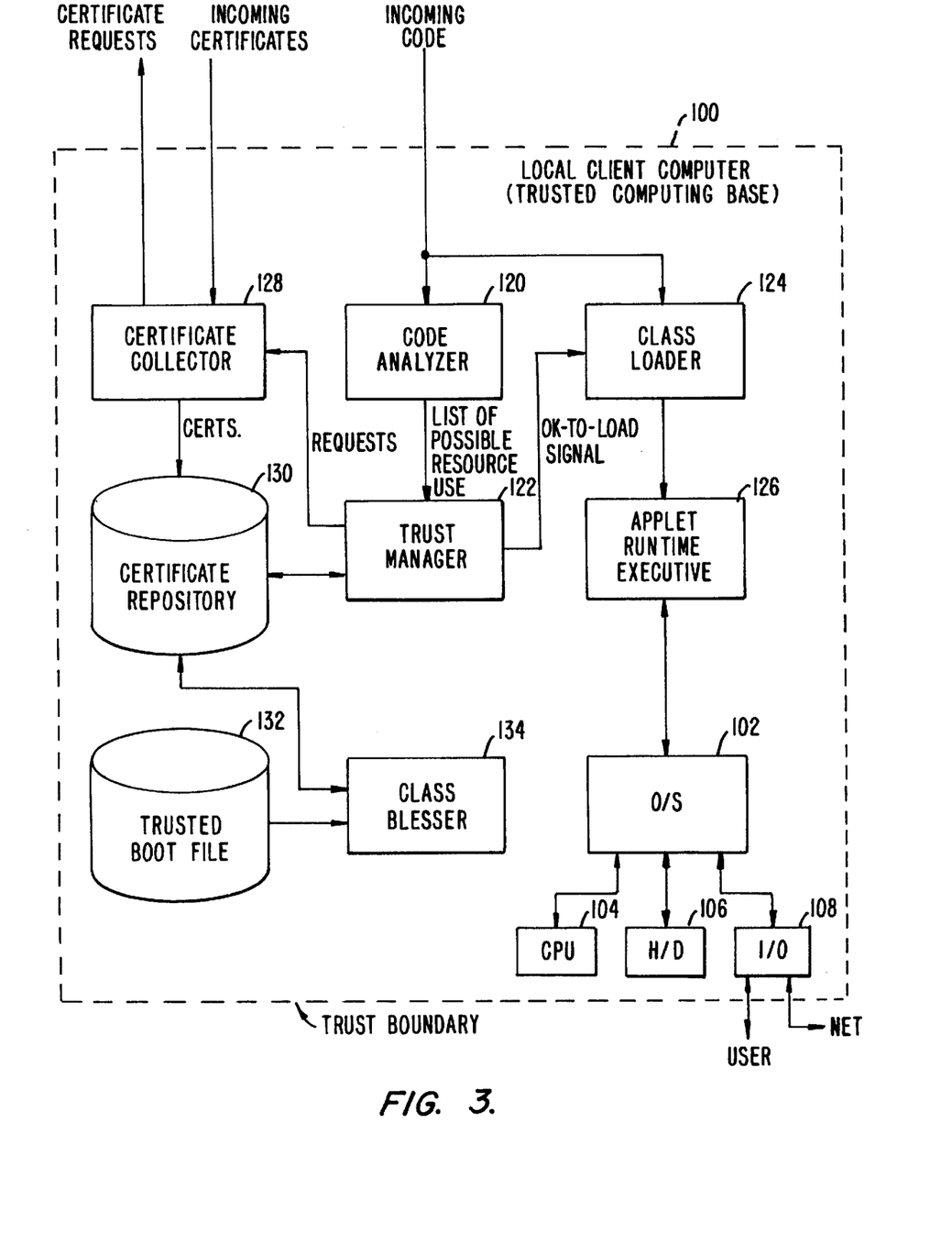
FIG. 3 is a block diagram of the trust manager components found on a client computer being protected.

FIG. 3 is a detailed block diagram of a trust management system which can provide the access control for a local computer 100. While local computer 100 includes other elements, only those relevant to trust management are shown. Existing systems, such as those compatible with the Java™ language, might include a class loader 124, and an applet runtime executive 126 for executing the loaded classes. The loaded classes might then access an operating system kernel 102 and from there control a CPU 104, access data files on a hard drive 106 or communicate outside the trust boundary using I/O 108. In a preferred embodiment, local computer is a computer running an operating system such as Microsoft's Windows operating system, Apple's Macintosh operating system, or a variation of the Unix operating system.

The preferred embodiment for use with Java applets includes the class loader and runtime executive from the Java runtime system, modified according to the present invention.

When a new class is introduced to local computer 100, modifications to class loader 124 cause a trust manager 122 to be called before a new class is loaded. The code of the class is also provided to a code analyzer 120 which determines what classes are called and what possible computer resources might be used by the code. With this information, the trust manager reads certificates from a certificate repository 130 (and requests additional certificates from a certificate collector 128) when needed. The certificates make statements about the trustworthiness of the code and its source. These claims in these certificates are strung together like a set of statements in a logical proof until the claims prove that the code can be trusted. Generally, a proof ends with a policy claim, which does not need to be proved. Policy claims are stored in a trust boot file (TBF) 132 and serve as the "axioms" used in the proofs. The claims in the TBF are taken as being true, since they are stored on a machine within the trust boundary and thus is assumed secure. For simplicity, the policy claims from TBF 132 might be loaded into certificate repository 130 so that they can be indexed along with the other claims found therein.

TBF 132 and certificate repository 130 can be maintained by a class blesser program 134. In the preferred embodiment, class blesser program 134 is an interactive program which allows the user to modify, add and delete certificates in certificate repository 130 and TBF 132.

Figure 4:
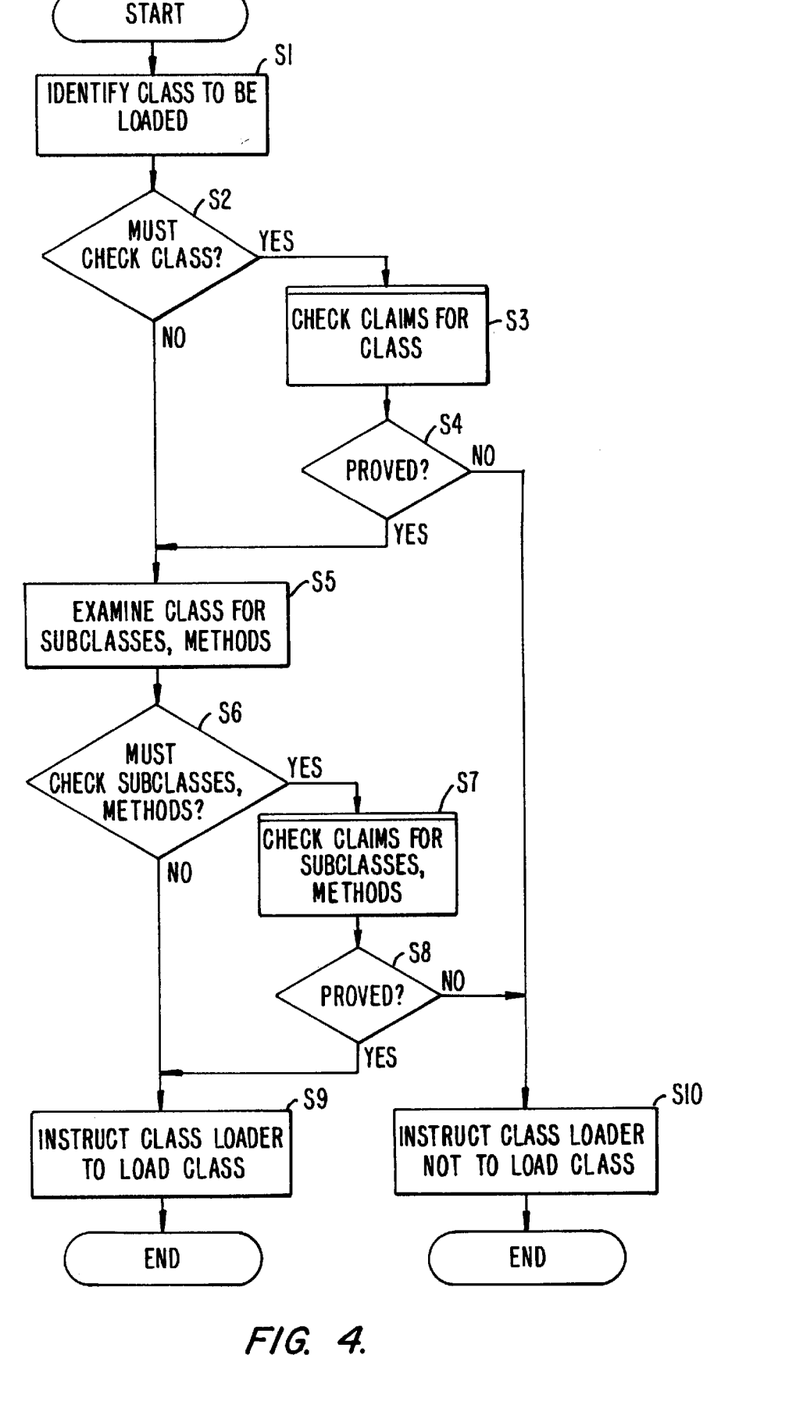
FIG. 4 is a flowchart illustrating the process of checking a class before loading to ensure that the class will not violate a security policy if allowed to execute.

The operation of the system shown in FIG. 3 will now be described with reference to the flowcharts of FIGS. 4 and 5. Once a class is obtained by local computer 100, usually in response to navigation to a site which sends out Java applets, the class loader attempts to load the class. Because of the hooks placed in the standard class loader 124 (trust management modifications to classloader.c in the standard Java runtime), the class loader 124 does not pass the class on to applet runtime executive 126 unless it receives an "OK-to-load" signal from trust manager 122. Code analyzer 120 determines a unique identifier for the class (S1), as well as a superclass reference, a list of subclasses for the class, methods of the class and a hash code of the class. Once code analyzer 120 determines this information, it passes the information to trust manager 122.

When presented with the information about a class, trust manager 122 checks to determine if the class needs to be checked (S2). Trust manager 122 does this by examining claims to see if a claim exists of the form "MustCheckClaim where class==class_a" where class_a is the class being checked or a regular expression matched by the class. Of course, to avoid continually searching, trust manager 122 might cache a list of the classes which need to be checked or the certificate repository can be indexed by claim type so MustCheckClaim claims can be quickly scanned.

If the class must be checked, the collection of claims in certificate repository 130, TBF 132 and externally retrieved certificates are checked for a "LoadOkayCert" claim (S3). This process of proving a claim is explained in more detail below in connection with FIG. 5. If the trust manager finds that the claim is proved (S4), the trust manager proceeds to determine what subclasses and methods are used in the class (S5) and to examine the collection of claims to determine if any of those subclasses or methods need to be checked (S6). If the trust manager determines, in step S2, that a class need not be checked, the trust manager proceeds directly to steps S5 and S6.

Figure 5:
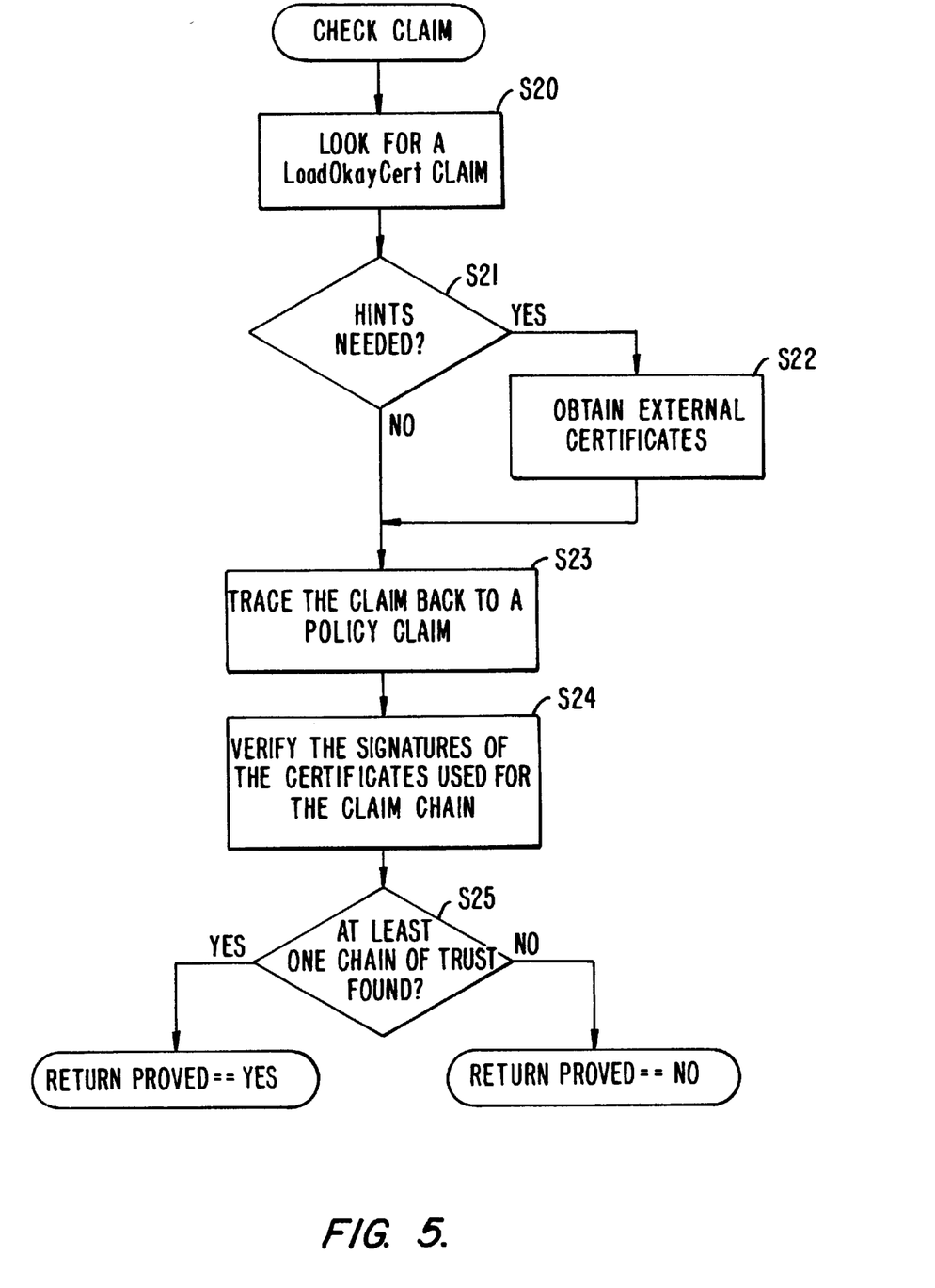
FIG. 5 is a flowchart of a subprocess shown in FIG. 4 illustrating the process of clearing certificates for a class.

If, at step S6, the trust manager determines that a subclass or method needs to be checked, that is done (S7) by the process described in FIG. 5 as in step S3. If the trust manager finds that claim to load a class with the checked subclass or method (S8) or the trust manager determined in step S6 that checking was not required, the trust manager instructs the class loader (via an OK-to-load signal, or otherwise) to load the class (S9). If, at step S4 or step S8 the trust manager cannot prove the required claim, the trust manager instructs the class loader not to load the class (S10). At the conclusion of the process, the trust manager instructs the class loader to either load or not load the class. It should be understood that the trust manager's output is not limited to use in making a load/no load decision, but to the more general question of trust or no trust. For example, the trust manager's determination could be used to decide whether to execute code or not (in most cases, controlling code loading and code execution can achieve the same security goals), whether to forward a message or not, or to perform a security function or not.

Referring now to FIG. 5, a flowchart is shown which describes the claim proving process in more detail. First, the trust manager looks in the certificate repository or TBF for a LoadOkayCert claim, asserting that it is okay to load the class being tested (S20). In the simplest case, such a claim is in the form of:

ClaimKey states {LoadOkayCert where class==class_a} where class_a is the class being tested. Of course, this above claim should only be trusted if ClaimKey is a trusted entity (more precisely, the entity represented by the key presented as ClaimKey) and ClaimKey's authority to make the claim is verified. ClaimKey's authority can be proved by reference to another claim, such as one that states that SecondKey states that ClaimKey can make such a claim and yet another claim which states that SecondKey is to be trusted. If the latter claim is a policy claim, it is taken as being true.

If a LoadOkayCert claim cannot be immediately found, hints might be needed to find such a claim. The trust manager uses the hints provided in certificates to locate more certificates (S22), possibly including the desired LoadOkayCert. As a practical matter, the trust manager will have a limit of how far out it will search for certificates. Many hints are listed in certificates (see FIG. 6). In one embodiment, the certificate signature signs the claims and the hints (i.e., the signature is a function of the hints, among other data elements). In that embodiment, hints can be trusted, to the same degree that the certificate in which the hint was found can be trusted. In another embodiment, hints are not part of what is signed in the certificate. In that embodiment, the hints are easier to change, but cannot be trusted. Even though a hint cannot be trusted, they can still be used, since the certificates found by the hints are not trusted in any case until they are verified.

Once the external certificates are found (and preferably cached in the certificate repository), the trust manager attempts to find a chain of trust from the LoadOkayCert to a trusted claim (S23). As explained above, if the claim has a claimant other than "POLICY", then the authority and identity (key-wise) of the claimant must be proved by another claim. For example, if the claimant for the LoadOkayCert claim is the key of a software manufacturer, and another claim is found in which the key of a corporate information systems department asserts that the software manufacturer is authorized to make a claim on the loadability of the class, and a corporate user has a policy claim asserting that any claim made by the corporate information systems department is to be trusted, then the LoadOkayCert claim has been traced, or proven, back to a policy statement.

Of course, before the trust manager trusts a claim, it should verify that the certificate is signed by a trusted entity and has not been modified since it was signed (S24). The operations of steps S23 and S24 might be intertwined for efficiency purposes. Steps S21 and S22 might also be intertwined. For example, given a LoadOkayCert, the trust manager might search for a path, verifying the signature of each certificate from which a claim is taken to form the path, backing up and abandoning all or part of the path if it cannot be proved further, and using hints to find more certificates as a path is being selected.

If at least one chain of trust evidenced by a path of verified claims ending with a policy claim is found at step S25, the process returns an indication that the claim has been proved. Otherwise, the process returns an indication that the claim has not been proved. The failure to prove can be due to several causes, but the effect is the same. The trust manager could have failed to prove a path by proving that no path can be proven, but this generally requires more information than is readily available. More often, the trust manager will find a negating path or no path after a diligent search. A negating path is where the trust manager is presented with a verified claim which asserts that the class is not to be trusted. In the preferred embodiment, to avoid having to determine which key is "more" trusted in case of a conflict, negating paths are not used. Instead, the effect of a negating path is provided by a MustCheckClaim claim and the lack of a LoadOkayCert claim.

The trust manager will keep searching for a path through the web of claims, using hints as needed, moving up and down along a path as dead ends are encountered. Eventually, the trust manager may exhaust all possible hints and have searched all available claims. However, since nothing in the architecture of claims, certificates and hints demands that the web be finite and manageable, the trust manager is preferably programmed to limit the amount of time and computation expended in the search for a path. If such a limit is reached, the trust manager proceeds as if no path exists. Presumably, if a user finds that paths are only infrequently found, the user might reexamine the policy claims an loosen up on security if the user's system is too secure to be useful. Referring again to FIG. 3, the user can change the policy claims in TBF 132 or certificates in certificate repository 130 using class blesser 134.

Figure 6:
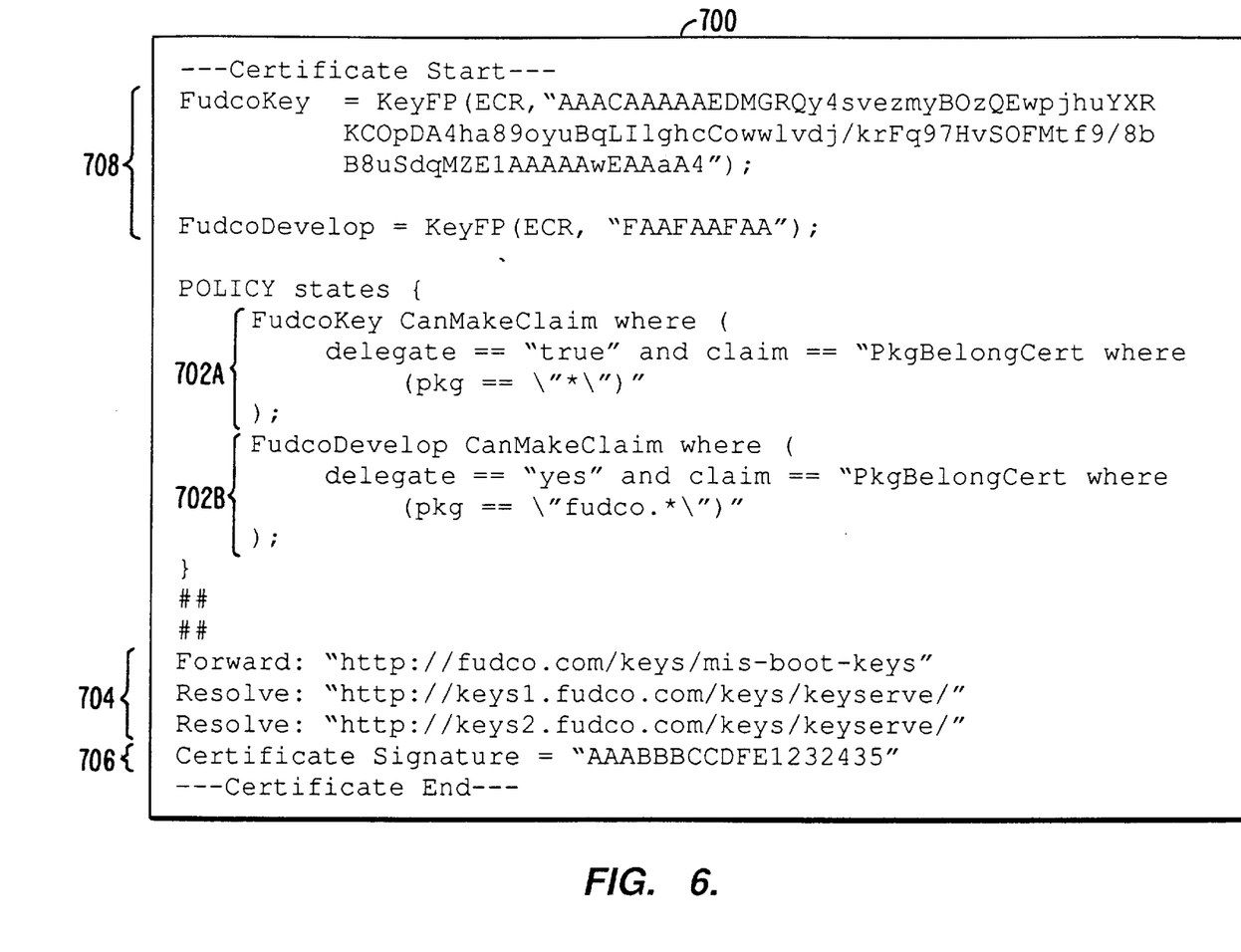
FIG. 6 shows an example of a certificate containing claims.

Referring now to FIG. 6, a simple certificate 700 is shown as might be found in certificate repository 130 or TBF 132. Certificate 700 contains two claims 702 (actually shown as a single, complex claim). In addition to claims 702, certificate 700 also includes three hints 704 and a certificate signature 706. To improve readability, certificates might include assignment statements such as assignments 708. When the certificate is used, the assignment variables are replaced in the claims with their values.

In the example shown, the policy makes two statements (claims). Since the claimant for the claims is POLICY (a.k.a TBF 132), the claims are taken as true. The first claim (702a) asserts that if FudcoKey makes a claim that a class belongs to a particular package, FudcoKey is to be trusted that the claim is true. Furthermore, FudcoKey can delegate this claim for another entity to make. In the second claim (702b), the claimant is POLICY and the claim asserts that if FudcoDevelop makes a claim that a class belongs to a particular package, FudcoDevelop is to be trusted that the claim is true, but only if the class is in a package matching the regular expression "fudco.*\". FudcoDevelop can delegate this claim for another entity to make.

Figure 7:
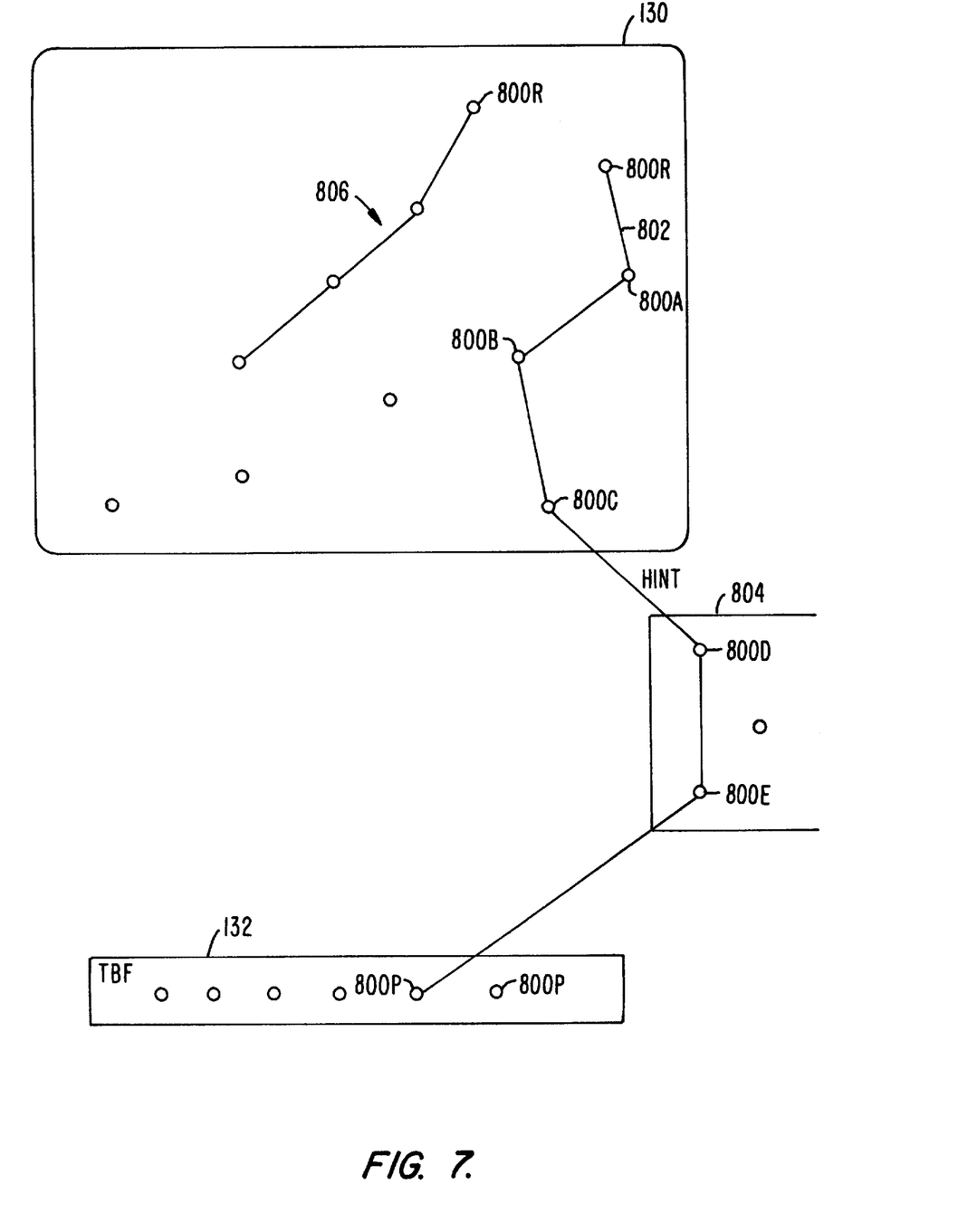
FIG. 7 is a graphical depiction of a web of trust as might be used in a trust system according to the present invention.

FIG. 7 is a graphical depiction of a web of trust as might be used in a trust system. Claims 800 are depicted as circles with links 802 connecting claims 800. Some of claims 800 are contained within certificate repository 130, while others are found in an external repository 804 using hints. Other claims, which are policy claims 800p, are stored in TBF 132.

If it is determined that clearance to trust is required to grant a particular access, a path of trust must be found before the access will be granted by the trust manager. Clearance to trust might be required, for example, where a policy claim states that a particular class must be checked prior to being executed and the access requested in execution access for the class. This requirement is set by a MustCheckClaim policy claim.

The path of trust begins with a relevant claim 800R and ends with a policy claim 800P. Relevant claims 800R are claims which purport to allow the access sought, such as an LoadOkayCert claim. FIG. 7 shows one path 806, which is incomplete since it does not end with a policy statement. This might occur where the key associated with a relevant claim is claimed to be trustable by another claim, but the key of that other claim cannot be verified. While many possibilities exist, one possible path of trust could include the following claims:

800R: KeyA states LoadOkayCert where Class=="X"

800A: KeyB states KeyA CanMakeClaim where (Claim==LoadOkayCert and Class=="X")

800B: KeyC states KeyA CanMakeClaim where PkgBelongClaim where pkg=="X*"

800C: KeyD states KeyB CanMakeClaim where Claim=="*"

800D: KeyMIS states KeyC CanMakeClaim where Claim==CanMakeClaim

800E: KeyMIS states KeyB CanMakeClaim where Class="X"

800P: POLICY states KeyMIS CanMakeClaim where Claim="*"

The above is a path of trust which might exist where a user, having certificate repository 130, deferred to a corporate MIS department on which keys should be trusted. If such is the case, then repository 804 might be an MIS certificate repository, where claims 800D and 800E were found using hints found in repository 130. If desired, the trust manager can incorporate these claims into repository 130 for later use. Of course, for each of these claims (except the policy claim) to be used, their keys must have been verified.

In summary, a claim statement asserts a rule for deciding the trustworthiness of keys, classes, or packages. The trustworthiness of the claim statement must, in turn, be determined. This leads to a chain of trust from a claim being proved to a known true claim. Using this architecture, trust decisions can be delegated to trusted entities. In order to verify that claim statements made by trusted entities were actually made by those trusted entities, the claim statements are signed by those trusted entities.

The above description is illustrative and not restrictive. Many variations of the invention will become apparent to those of skill in the art upon review of this disclosure. For example, while the trust manager described above uses a trust decision to decide whether or not to load a class, in a variant of that trust manager, all classes might be loaded and the trust decision is used to decide whether or not to execute the code. Furthermore, the trust delegation system described above need not be limited to determining whether a class can be safely executed or not. The trust delegation system could be used to determine authorization in an electronic mail system, a physical security system, control processes in manufacturing and the like.

The scope of the invention should, therefore, be determined not with reference to the above description, but instead should be determined with reference to the appended claims along with their full scope of equivalents.

Appendix A

The following is a listing of a file which is used as a certificate repository. The interspersed comments printed in italics are not part of the file.

*1) In the following certificate, if "sigKey" is trusted to make this claim and the certificate is validly signed, "claimKey" is then trusted to make claims (CanMakeClaim) can sign PkgBelong claims about classes in any ec.\* package.*

```
sigKey = KeyFP(ECR, "E946976B2C2B60A0EBD81A6D85FB97C5"); claimKey =
KeyFP(ECR,"A6DDA2DC0EB37FC9CS2EE1D9C8C7FA08"); sigKey states {
    claimKey CanMakeClaim where (delegate == "no" and
    claim == "PkgBelongClaim where (pkg == \"ec.*\")");
}

414141416742644F74656A6C534F6F6A53762B376962786236656E6A7157
385038393776786B56525A42763648796D68477A675863567A3044797172
6B5431300A365937456D474E48584D48513234324A694C77777246314D57
6D4246385448694633474B564E2B784F4651376l7A6E6C396E6964566E5A
55423467744A524D4F0A3548536676474C457269794D3230457A59635953
5A704D59314762315A336252674D6D724D52365731554F44414F49760A

```

*2) PkgBelongClaim - a certificate with all of the PkgBelongClaims for the package ec.auth*

```
sigKey = KeyFP(ECR,"F7093026AC529594D1F2D08A858393FE"); sigKey states {
LoadOkayClaim where (
    loading_class == "ec.auth.llclaim" and
    loading_class_hash == "1AD34C307C54183A17414AFBEF366777" and
    loaded_class == "ec.gendb.BTreeDB" and
    loaded_class_hash == "E66E35EAC6418B70A1A96AD8A7E4AS0C");
LoadOkayClaim where (
    loading_class == "ec.auth.llpred_clause" and
    loading_class_hash == "A504844E3AF03C217046CF694C336C88" and
    loaded_class == "ec.gendb.BTreeDB" and
    loaded_class_hash == "E66E35EAC6418B70A1A96AD8A7E4A50C");
LoadOkayClaim where (
    loading_class == "ec.auth.llclaim_stmt" and
    loading_class_hash == "3A7A5C53E73F5D7DED76CCFD306BF9C2" and
    loaded_class == "ec.gendb.BTreeDB" and
    loaded_class_hash == "E66E35EAC6418B70A1A96AD8A7E4A50C");
}

41414141514A7477396E79386948676D503046416B694550664D48363050
6E307936396455307l694163346A756C306B6363704854416C5746795855
6B7478620A2F69674F6565464B586842394756317A4B6B734E546F58662F
564C360A

```

*3) LoadOkayClaim - a certificate with LoadOkayClaims for the loaded class ec.auth.llkey_list*

```
sigKey = KeyFP(ECR,"9376D1DFAF571807SB6AA0E9C02DA0A0");
sigKey states {
LoadOkayClaim where (
    loading_class == "ec.auth.KeyStruct" and
    loading_class_hash == "E1126178BA58697F24F8611444DBFA98" and
    loaded_class == "ec.auth.llkey_list" and
    loaded_class_hash == "863SE6AFFC7AEE201528DA269BEB4B12");
LoadOkayClaim where (
    loading_class == "ec.auth.CBTrustManager" and
    loading_class_hash == "B0ACFB04CBA04A80C5C7C25917E426BC" and
    loaded_class == "ec.auth.llkey_list" and
    loaded_class_hash == "8635E0AFFC7AEE201528DA269BEB4B12");
LoadOkayClaim where (
    loading_class == "ec.auth.CUP$actions" and
    loading_class_hash == "17F753F0B4D633B69106C51A53A35CA9" and
    loaded_class == "ec.auth.llkey_list" and
    loaded_class_hash == "8635E0AFFC7AEE201528DA269BEB4B12");
}

4141414151475130497S6F523858335170386E445971374D573164454942
51324443554F33767077457A53346A6A68364E2B7139544D355A41652F6C
546D67430A55784764324C4B6E494F374B493645364741374F4270493071
4F70450A

```

What is claimed is:

1. A method of authenticating claims in a trust system wherein access to resources of a computer system by an object is granted or denied based on one or more claims about the access and the computer system, wherein a claim is a statement about a rule in the trust system relating to the object, the method comprising the steps of:

identifying one or more trusted claims for the object;

determining whether clearance to trust the object exists from the trusted claims;

when the existence of clearance to trust is determined in the step of determining, granting the access; and when the existence of clearance to trust is not determined in the step of determining, performing the steps of:
(a) examining one or more claims in a claim repository to identify a relevant claim that asserts that the access is grantable to the object;
(b) seeking a path of trust through the claim repository from the relevant claim to one of the trusted claims, wherein a path is a list of claims from the relevant claim to the one of the trusted claims joined by links specified in the claims and wherein a path of trust is a path wherein each claim is authenticated;
(c) when a path of trust is found and each claim in the path of trust is verified, granting the object the access; and
(d) when a path of trust cannot be found after a finite search, denying the object the access.

2. The method of claim 1, wherein the finite search comprises the step of locating each possible path from the relevant claim to a trusted claim unless a predetermined effort level is reached.

3. The method of claim 1, wherein the step of identifying one or more trusted claims is a step of reading a trusted boot file which is secure within a trust boundary of the computer system.

4. The method of claim 1, wherein the step of examining and the step of seeking a path each comprise substeps of:
examining certificates in a certificate repository to locate hints referencing additional claims; and
using one or more additional claims to complete the path of trust.

5. The method of claim 4, wherein claims are included in certificates, the step of using one or more additional claims comprising a step of using a hint from a certificate to locate additional claims which are likely to link a claim in the certificate to another claim in the path of trust.

6. The method of claim 5, further comprising a step of storing claims and certificates located in the certificate repository for later use in later authentication and claims checking steps.

7. The method of claim 1, wherein the step of granting access is a step of allowing an object to load and execute on the computer system and the relevant claim is a claim identifying the object and stating that execution of the object is allowable.

8. The method of claim 1, wherein the trusted claim is a claim which is either a policy statement or a previously authenticated claim.

9. The method of claim 1, further comprising a step of authenticating claims, wherein a claim is authenticated by verifying a key associated with the claim.

10. The method of claim 9, wherein at least one claim in the path of trust is a claim about keys associated with claims.

11. The method of claim 1, further comprising the steps of:
using a code analyzer to determine which resources could possibly be used by a class when executed;
granting access when either a relevant claim is not needed for access to the resources or a relevant claim and a path of trust is found for access to each of the resources.

12. The method of claim 1, wherein the process of verifying the claim where a claim is not a trusted claim prior to verification comprises the steps of:
(a) authenticating a key provided with the claim;
(b) checking that the key has authorization to make the claim; and
(c) if the authorization for the key to make the claim is provided by a second claim which is not a trusted claim, repeating steps (a) through (c) to authenticate the second claim and subsequent claims, if any.

13. The method of claim 12, wherein the key is associated with a claimant.

14. A trust management system for deciding whether to execute a portion of code on a user system, the portion of code being provided by a code supplier, code suppliers having varying levels of trust, the trust management system comprising:
a policy file which includes claims about security policies of the user system;
a certificate repository for storing a plurality of certificates, a certificate being a data record including claims;
means, coupled to the certificate repository, for receiving certificates and storing the certificates in the certificate repository;
a code examiner, coupled to receive the portion of code from the code supplier and adapted to analyze the portion of code to determine potential resource use of the portion of code; and
a trust evaluator, coupled to the policy file, the certificate repository and the code examiner, wherein the trust evaluator is adapted to determine a path of trust from a relevant claim to a trusted claim and to authenticate claims in the path of trust, where the path of trust, if required, specifies whether execution of the portion of code is allowed by the policy rules and the potential resource use.

15. The trust management system of claim 14, wherein the code examiner is a class examiner.

16. The trust management system of claim 14, wherein the applicable certificates are enveloped from the code supplier with the portion of code.

17. A method of authenticating an untrusted claim in a trust system, comprising the steps of:
(a) authenticating a key provided with the untrusted claim;
(b) checking that the key has authorization to make the untrusted claim;
(c) if the authorization for the key to make the untrusted claim is provided by a second claim which is not itself a trusted claim, repeating steps (a) and (b) to authenticate the second claim; and
(d) repeating steps (a), (b) and (c) with subsequent claims until a trusted claim is reached or a predetermined computing effort is expended.

* * * * *